United States Patent [19]

Abe

[11] Patent Number: 5,719,844
[45] Date of Patent: Feb. 17, 1998

[54] DISC LOADING/EJECTING MECHANISM AND A DISC PLAYER INCLUDING SAME

[75] Inventor: Hiroshi Abe, Iwaki, Japan

[73] Assignee: Alpine Electronics, Inc., Tokyo, Japan

[21] Appl. No.: 546,857

[22] Filed: Oct. 23, 1995

[30] Foreign Application Priority Data

Nov. 2, 1994 [JP] Japan .................... 6-293727

[51] Int. Cl.$^6$ ............................ G11B 33/02
[52] U.S. Cl. ............................ 369/77.1
[58] Field of Search .................. 369/75.2, 77.1

[56] References Cited

U.S. PATENT DOCUMENTS

| | | | |
|---|---|---|---|
| 4,628,498 | 12/1986 | Takamatsu et al. | 369/77.1 |
| 5,031,169 | 7/1991 | Kato et al. | 369/77.1 |
| 5,173,893 | 12/1992 | Morikawa et al. | 369/75.2 |
| 5,195,077 | 3/1993 | Ishikawa et al. | 369/75.2 |
| 5,260,925 | 11/1993 | Camps et al. | 369/75.2 |

*Primary Examiner*—Stuart S. Levy
*Assistant Examiner*—David D. Davis
*Attorney, Agent, or Firm*—Guy W. Shoup

[57] ABSTRACT

A disc loading/ejecting mechanism and a disc player including the same wherein a disc is clamped by a guide member and a roller during loading and ejection. The roller is tapered from its ends toward its central portion such that the smallest diameter is at the central portion. A guide top is pivotally connected to a casing of the disc player and includes lower surfaces in the shape of upside-down "V"s having inclined surfaces which come closer to the roller at both end portions thereof. Opposing edges of an inserted disc are clamped by the inclined surfaces and tapered portions of the roller. However, since the guide top pivots on a support shaft, the guide top follows the position of the disc so that uniform carrying force is always provided to the disc. When a disc having a small diameter is inserted at the deviated position, both edges of the small-diameter disc are securely clamped by the inclined surfaces and the tapered portions of the roller due to the pivoting of the guide top so that the small-diameter disc is securely ejected at once upon insertion thereof.

12 Claims, 7 Drawing Sheets

DISC LOADING/EJECTING MECHANISM AND A DISC PLAYER INCLUDING SAME

BACKGROUND OF THE INVENTION

1. Field of the Invention

The present invention relates to a disc player such as a vehicle-mounted CD player, and more particularly, to a disc loading/ejecting mechanism for a disc player in which a disc is clamped by a guide member and a roller so as to be pulled into and ejected from the disc loading mechanism due to the rotating force of the roller.

2. Description of the Related Art

FIG. 6 is a plan view showing a simplified configuration of a conventional vehicle-mounted CD player, and FIGS. 7A and 7B are front views each showing a disc being loaded into the CD player, as viewed from the direction shown by an arrow VII of FIG. 6.

According to the vehicle-mounted CD player shown in FIG. 6, a disc loading mechanism A is provided at a location where the disc is pulled into the CD player, and a disc driving device B is provided behind the disc loading mechanism A. The disc driving device B is provided with a turntable T, a spindle motor for rotationally driving the turntable T, a clamper for clamping a center portion of the disc to the turntable T and an optical head H for reading signals stored on the disc.

The disc loading mechanism A consists of a roller 1 for providing pulling-in and pushing-out (ejecting) forces to the disc and a guide top (guide member) 2 disposed above the roller 1. The guide top 2 is a member having the function of guiding the disc during loading and ejecting and is formed of a material having a low friction coefficient, such as a synthetic resin. The guide top 2 is fixed to the upper portion of a case. The roller 1 is formed of a material having a relatively high friction coefficient, such as a synthetic rubber, and a roller shaft 1a is supported by support levers (not shown) provided on both sides thereof. Both support levers are urged upward by means of springs 3, 3. By the urging forces of the springs 3, 3, both end portions of the roller 1 are pressed with approximately uniform pressure against the guide top 2.

When the disc is inserted through an opening of the CD player during a disc loading operation, the roller 1 is rotated by the power of a motor. The disc is clamped by the roller 1 and the guide top 2, and pulled into the disc driving device B by the rotating force of the roller 1. When the central portion of the disc coincides with a center of the turntable T, the central portion of the disc is clamped to the turntable T by means of the clamper. At this time, the roller 1 is separated from the guide top 2 and moved downward. Conversely, when the disc is ejected, the roller 1 moves upward to be pressed against the guide top 2 by means of the elastic force of the springs 3, 3, and the disc is clamped by the roller 1 and the guide top 2. At the same time, clamping of the disc with respect to the turntable T is released and the disc is pushed out (ejected) from the opening by the rotating force of the roller 1.

The prior art shown in FIG. 6 is a vehicle-mounted CD player in which a disc D2 of a large diameter (for example, 12 cm in diameter) is loaded. Such a CD player typically includes a device for discriminating and discharging a disc D1 of a small diameter (for example, 8 cm in diameter) when it is inserted therein. Thus, detection pins 4, 4 for discriminating the diameter of inserted discs are provided outside of the disc loading mechanism A.

The detection pins 4, 4 are positioned at a distance W which is a little longer than the diameter of the disc D1. The detection pins 4, 4 are pressed outward (in the directions shown by the arrows a) from the positions shown in FIG. 6 when the disc D2 is inserted, and return to their original positions due to the urging force of springs when the disc D2 is mounted on the turntable T. When the detection pins 4, 4 are pressed outward, associated detectors (not shown) are actuated which indicate that a disc having the size D2 has been inserted. Conversely, when the disc D1 is inserted, the detection pins 4, 4 are not simultaneously pushed outward.

By detecting whether or not the detection pins 4, 4 are simultaneously pushed outward, the disc player discriminates whether a disc D1 or a disc D2 is being inserted. When insertion of the disc D2 is detected, the disc D2 is pulled in by the disc loading mechanism A toward the disc driving device B. However, when insertion of the disc D1 is detected, the disc mechanism A is driven in the opposite direction to eject the disc D1.

According to the conventional disc loading mechanism A shown in FIG. 7, the roller 1 includes ends having a relatively large diameter, and tapers to a relatively small diameter at a central portion thereof. Similarly, the guide top 2 includes inclined surfaces 2a, 2a which are closely spaced from the roller 1 at both end portions thereof and includes a central point which is located above the central portion of the roller 1. Thus, a space is formed between the roller 1 and the guide top 2 which is widest at the central portion thereof and decreases gradually to both ends thereof from the central portion.

Due to the shape of the roller 1 and the guide top 2 as described above, only the outside edges of the disc are pressed by the roller 1 and the guide top 2 upon loading and ejection of the disc so that the information bearing surfaces of the disc are not scratched by sliding against the roller 1 or the guide top 2.

However, since the guide top 2 is fixed to the casing such that it is approximately parallel to the roller shaft 1a, the disc clamping pressure applied by the roller 1 and the guide top 2 may differ at the right and left edges of the disc during loading or ejecting. In addition, the loading/ejecting force acting on the disc may be unbalanced if the guide top is deformed due to twisting and warping caused at the time of manufacturing, or when the urging forces from the springs 3, 3 do not act uniformly on the roller shaft 1a.

In addition, even if there is little twisting or warping in the guide top 2, the central portion of the disc D2 may be slightly deviated toward either of right and left directions in FIG. 6 with respect to the disc loading mechanism A upon insertion of the disc D2. In this case, the disc clamping pressure by the roller 1 and the guide top 2 may differ at the right and left edges of the disc D2, and the loading force may not act uniformly on either side of the disc D2. When the difference in loading force at both edges of the disc is produced at the time of loading the disc D2, the disc D2 cannot be loaded onto the disc driving device B in an exact linear path so that the edge of the disc D2 is damaged by abutting strongly against the guide portion or another mechanism in the main body of the disc player, or an excessive load from the disc D2 acts on the roller 1.

When the disc D1 is clamped at the axial central portion of the roller 1 as shown in FIG. 7A, a uniform ejecting force can be applied to both side portions (edges) of the disc D1 when the disc D1 is immediately ejected. However, when the disc D1 is inserted in a position deviated toward one end of the roller 1, as shown in FIG. 6 by short dashed lines and also in FIG. 7, one side of the disc D1 is securely clamped by the roller 1 and the guide top 2 (position b), but the other end of the disc D1 is either entirely separated from the roller 1 and the guide top 2 (position c), or the clamping force at position c is substantially less than at position b. Thus, the rotating force of the roller 1 does not act on both sides of the disc D1 when the disc D1 is immediately ejected.

As described above, insertion of the disc D1 can be detected by the detection pins 4, 4 and the disc D1 can be ejected immediately. However, if the right-side detection pin 4 is inserted in the disc player in the deviated position, as shown in FIG. 6, the detection pin 4 cannot be pressed outward (in the direction shown by the arrow a) due to a deviation of the ejecting force with respect to the disc D1, so that the disc D1 may keep rotating in the direction d in the deviated position (shown by the short dashed lines in FIG. 6) due to an ejection force acting only on the position b, and the disc D1 cannot be ejected through the opening.

SUMMARY OF THE INVENTION

It is an object of the present invention to provide a disc loading/ejecting mechanism of a disc player having a space formed between opposing portions of a guide member and a roller which becomes gradually narrower from the central portion thereof to both end portions thereof in which uniform loading/ejecting force can be acted on both edges of the disc.

According to an aspect of the present invention, there is provided a disc loading/ejecting mechanism which has a guide member and a roller pressed toward each other and which performs loading and ejecting of a disc into/out of the disc player due to the rotating force of the roller, wherein a space is formed between opposing portions of a guide member and the roller which gradually becomes narrower from the axial center to both axial end portions of the roller, and the guide member is tiltably pivotally supported at a point adjacent the axial center of the roller.

That is, an inclined surface having an upside-down "V" shape which gradually comes closer to the roller near both end portions thereof from the central portion thereof is formed on the guide member, and the roller is shaped to have its diameter small at the central portion thereof and increasing gradually to both end portions thereof from the central portion. In alternative embodiments, the roller may be shaped into a round bar having uniform diameter which is disposed below the inclined surface of the guide member, or the surface of the guide member opposing to the roller may be planar, and located above the roller shaped to have its diameter increasing gradually to both end portions thereof from the central portion, as described above.

In addition, urging members for keeping the guide member parallel to a support member supporting the guide member may be provided between the guide member and the support member. The urging members may be plate springs formed separately from and mounted on the guide member. Conversely, the urging members may be elastic parts formed integrally with the guide member so as to maintain the guide member approximately parallel to the support member.

Further, when the guide member is formed by a material having a low friction coefficient and the support member is formed by a sheet metal material, a force of the elastic parts may uniformly act on the support member. Therefore, the guide member is maintained more parallel to the support member, and the elastic parts can be easily formed integrally with the guide member.

In the disc loading/ejecting mechanism constituted as described above, the roller is pressed toward the guide member in a state approximately parallel to the support member by means of springs mounted, for example, adjacent both end portions of the roller shaft which is supported by a common roller support member. At the opposing portion of the guide member and the roller, a space is formed which is widest at the axial central portions of the roller and decreases gradually to both axial ends of the roller from the axial central portion. Right and left end portions (edges) of the disc are clamped by the guide member and the roller so as to be carried due to the rotating force of the roller. The guide member is tiltably pivotally supported at a central portion of the guide member so that both right and left end portions thereof can alternately move closer to the roller. Thus, both end portions of the disc are securely clamped by the guide member and the roller at all times so that uniform carrying force acts on both end portions of the disc.

Therefore, even when the roller and the guide member are not exactly parallel to each other due to deformation of the guide member such as twisting and warping caused at the time of manufacturing and due to deformation of the roller support member, the guide member is tilted at the central portion thereof when clamping the disc in accordance with the unbalanced urging force of the roller. Therefore, both end portions of the disc are uniformly clamped by the guide member and the roller so that the disc can be carried by a well-balanced carrying force.

In addition, in the case of a disc loading/ejecting mechanism which accepts insertion of a large diameter disc and which detects and immediately ejects a small diameter disc upon insertion thereof, even if the small diameter disc is inserted at a position deviated toward either axial end portions of the roller, the guide member tilts to allow both end portions of the disc of a small diameter to be clamped by uniform pressure so that the disc can be reliably ejected.

Further, when urging members for keeping the guide member parallel to the support member are provided between the guide member and the support member supporting the guide member, the guide member is kept approximately parallel to the roller when the disc is not clamped thereby. Therefore, the forward end of the disc is easily guided into a space formed between the roller and the guide member when the disc is inserted into the disc player. When elastic parts formed integrally with the guide member are used as the above urging members, the increase in the number of parts is minimized, thereby simplifying the structure of the disc loading/ejecting mechanism.

DESCRIPTION OF THE PREFERRED EMBODIMENTS

The present invention will now be described with reference to the accompanying drawings.

Figure 1:
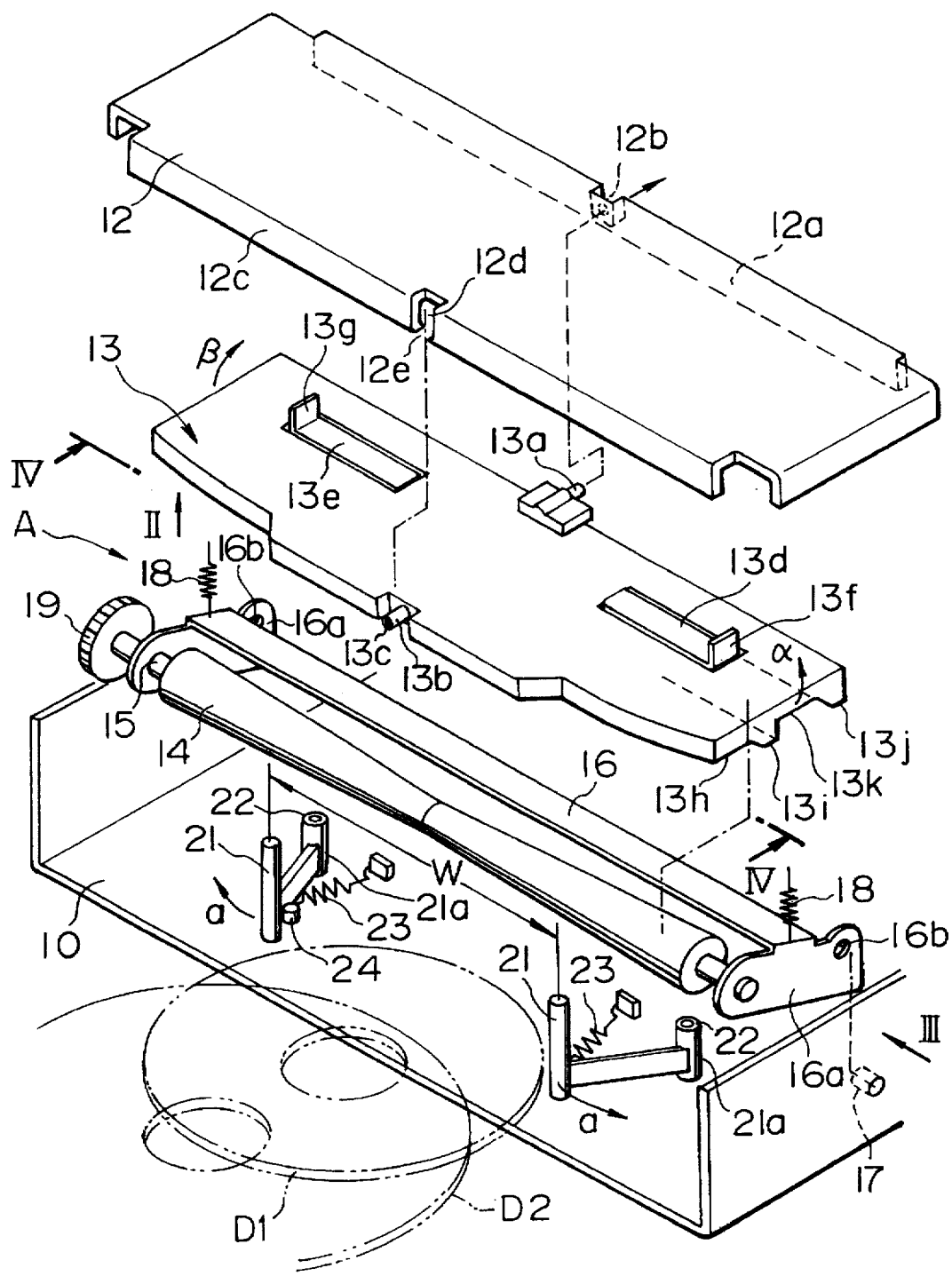
FIG. 1 is an exploded perspective view showing a disc loading/ejecting mechanism of a vehicle-mounted CD player according to the present invention.
Figure 2:
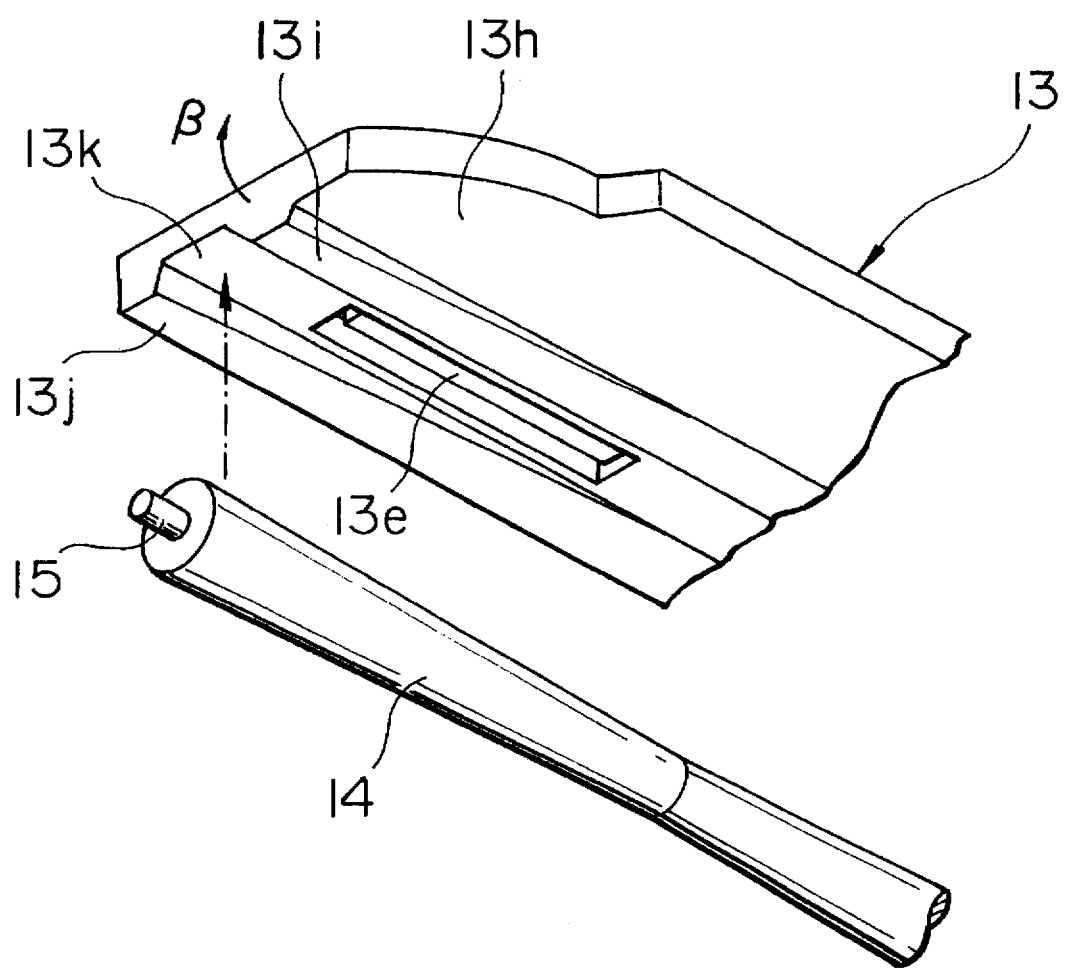
FIG. 2 is a perspective view showing a guide top and a roller viewed from the direction shown by the arrow II of FIG. 1.
Figure 3:
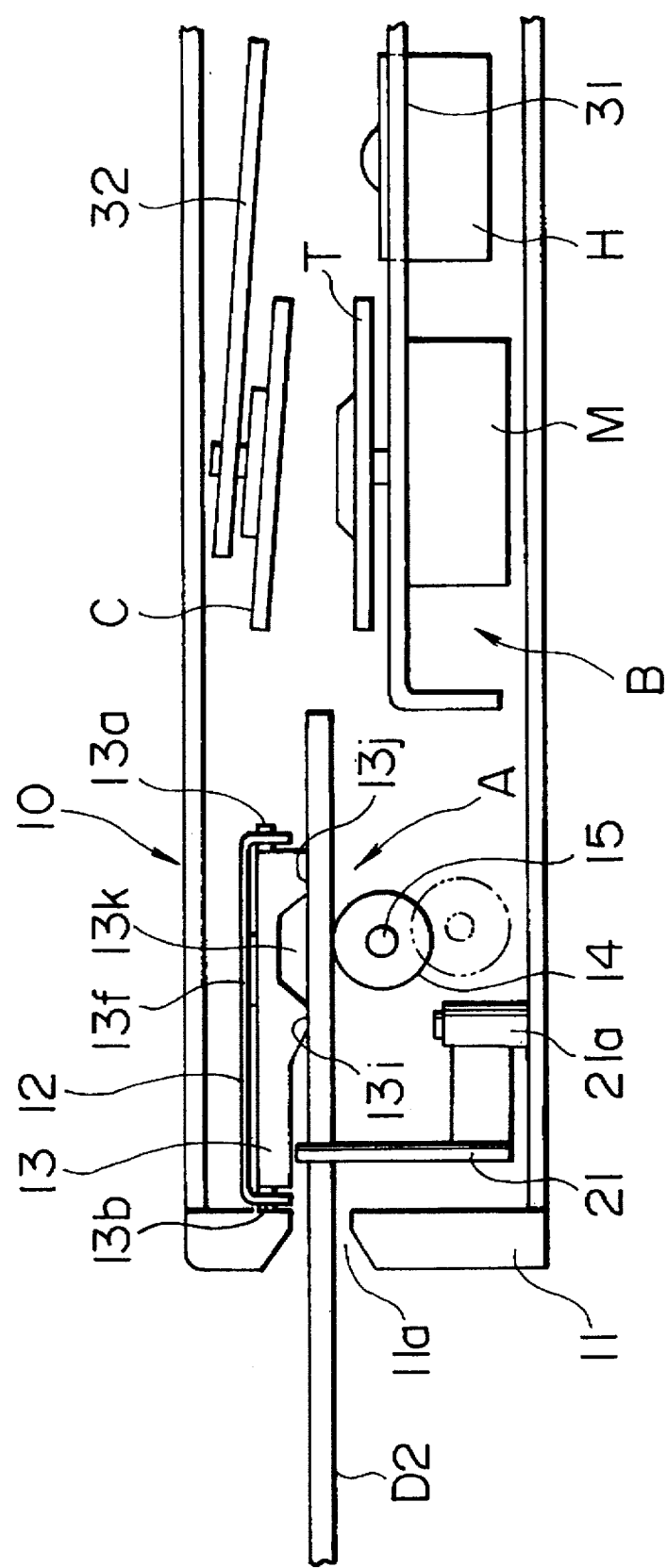
FIG. 3 is a partial side view of the CD player viewed from the direction shown by the arrow III of FIG. 1.
Figure 4:
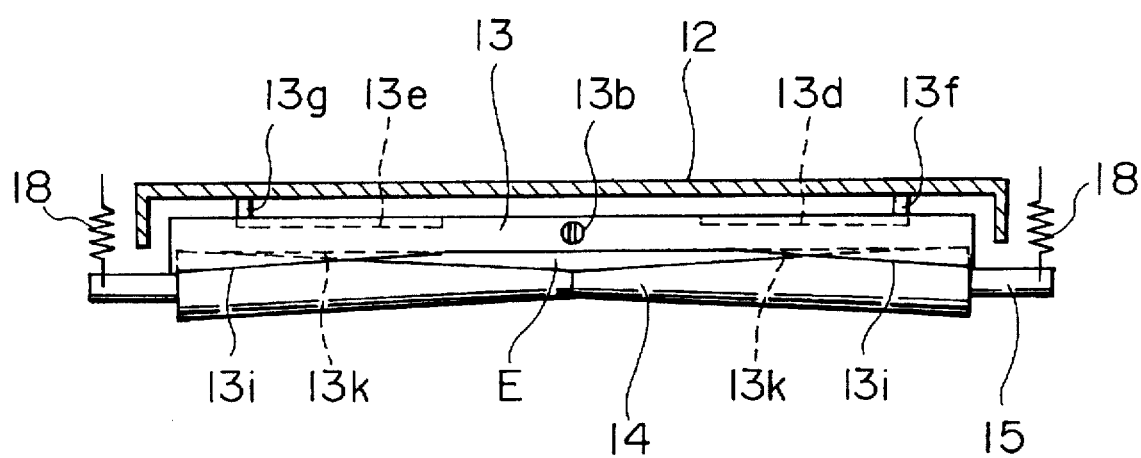
FIG. 4 is a sectional view taken substantially along the lines IV—IV of FIG. 1 which illustrates a disc loading/ejecting mechanism.

FIG. 1 is an exploded perspective view showing a disc loading/ejecting mechanism and surrounding structure of a vehicle-mounted CD player according to the present invention; FIG. 2 is a perspective view of a disc loading/ejecting mechanism (which consists of a guide top and a roller) viewed from the direction shown by the arrow II of FIG. 1; FIG. 3 is a side view of the CD player viewed from the direction shown by the arrow III of FIG. 1; and FIG. 4 is a sectional view taken substantially along the lines IV—IV of FIG. 1 which illustrates a loading/ejecting state of a disc. In FIG. 1, there is shown a casing 10 of the CD player which is made of a plate material. As shown in FIG. 3, a nose portion 11, which is a cosmetic portion made of a synthetic resin, is mounted over a front opening of the casing 10, and an opening 11a for disc insertion is formed in the nose portion 11.

Inside of the opening 11a, a support member 12, which is formed of a sheet metal material, is fixedly secured to the top of the casing 10 with screws or the like. A guide top 13 and a roller 14 which constitutes a disc loading/ejecting mechanism A (hereafter referred to as a disc loading mechanism) are provided under the support member 12.

The guide top 13 is made of a synthetic resin material having a low friction coefficient and is produced by injection molding. At the center position (the center position with respect to the axial direction of the roller 14) of the guide top 13, support shafts 13a and 13b protrude in directions parallel to a direction of disc insertion (that is, perpendicular to the axial direction of the roller 14). The support shaft 13a extends toward the back of the casing 10 and has the shape of a round bar. The support shaft 13b extends toward the opening 11a and has the shape of a split pin having a vertical groove 13c formed in the center thereof.

The support member 12 has a bent piece 12a located toward the back of the casing 10, and a support recess 12b is formed in the center of the bent piece 12a. The support member 12 also has a bent piece 12c at the opening 11a side thereof, and a support recess 12d is formed in the center of the bent piece 12c. The support recess 12d has a narrow opening 12e at the lower end thereof.

When the support shaft 13b is forced upward through the opening 12e of the support recess 12d while the support shaft 13a is inserted in the support recess 12b, the diameter of the shaft 13b is constricted by collapsing the vertical groove 13c. When the support shaft 13c is fully inserted into the support recess 12d, the diameter of the support shaft 13c resiliently returns to its original size due to its own elasticity.

The guide top 13 is mounted to the lower portion of the support member 12 with this simple mounting operation. In the mounted condition, the guide top 13 is tiltably pivotally supported by the support shafts 13a and 13b with respect to the support member 12. That is, the guide top 13 can be tilted pivoted in the directions shown by the arrows α and β about the center of fitting engagement of the support shafts 13a, 13b and the support recesses 12b and 12d.

The guide top 13 includes a pair of elastic parts 13d and 13e. Both elastic parts 13d and 13e are elastic arms formed integrally with the guide top 13, and act as spring members (urging members) due to the elastic force of the resin. The tips of the elastic parts 13d and 13e are abutment pieces 13f and 13g which extend upward. As shown in FIG. 4, the abutment of the abutment pieces 13f and 13g against the lower surface of the support member 12 allows the guide top 13 to be kept approximately parallel to the lower surface of the support member 12.

FIG. 2 illustrates the left side end portion of the guide top 13 viewed obliquely from the bottom. As shown in FIG. 2, inclined surfaces 13i and 13j which gradually come closer to the roller 14 from the axial center to the axial end of the roller 14 are formed on a lower surface 13h of the guide top 13. A groove 13k is formed between the inclined surfaces 13i and 13j. Likewise, in the right side of the guide top 13 as shown in FIG. 1, the inclined surfaces 13i and 13j, which gradually come closer to the roller 14, are formed on the lower surface 13h, and the groove 13k is formed between both inclined surfaces 13i and 13j.

That is, as shown in FIG. 4, the guide top 13 is symmetrical about the support shafts 13a and 13b.

The roller 14 is shaped such that a pair of tapering roller halves which are connected to each other and in which a diameter at the central portion thereof is small and increases gradually to both end portions thereof from the central portion. The roller 14 is also symmetrical about the axial center thereof.

A roller support member 16 is formed by bending a sheet metal material. Both end portions of the roller support material 16 are bent to form support pieces 16a, 16a. Support holes 16b, 16b are formed in the support pieces 16a, 16a which allow the roller support member 16 to be rotatably supported by a support shaft 17 fixed to the side plate of the casing 10. The roller support member 16 is urged upward by means of springs 18, 18.

The roller 14 is formed by a material having a high friction coefficient, such as a synthetic rubber, and adhered around a metal roller shaft 15 so as to be integral with the roller shaft 15. Both end portions of the roller shaft 15 are rotatably supported by the support pieces 16, 16 of the roller support member 16, and a gear 19 is fixed to one end of the roller shaft 15. Power from a motor provided in the casing 10 is transmitted from a gear train (not shown) to the gear 19, thereby rotating the roller shaft 15 and the roller 14 in both directions (i.e., clockwise and counterclockwise).

The roller support member 16 is urged upward by the elastic force of the springs 18, 18 so that the roller 14 is pressed to the guide top 13. As shown in FIGS. 2 and 3, the roller 14 is pressed in opposition to the groove 13k provided between the inclined surfaces 13i and 13j formed on the lower surface 13h of the guide top 13.

The guide top 13 is provided with the inclined surfaces 13i, 13i and 13j and 13j which gradually come closer to the roller 14 at both end portions thereof, and the roller 14 is shaped to have a smallest diameter located at the central portion thereof, and a gradually increasing diameter toward both end portions thereof from the central portion. Therefore, the guide top 13 and the roller 14 form a space E (shown in FIG. 4) which is widest at the axial central portion thereof and decreases gradually toward both ends thereof from the axial central portion.

When a disc is loaded in a disc driving device B so as to perform sound reproduction, the roller support member 16 is pressed down by a mechanism (not shown) so that the roller 14 evacuates to the position shown by short dashed lines in FIG. 3.

At positions located between the opening 11a and the disc loading mechanism A, a pair of detection pins 21, 21 are provided. These detection pins 21, 21 discriminate between a disc D1 having a small diameter (for example, 8 cm in diameter) and a disc D2 having a large diameter (for example, 12 cm in diameter). The CD player in this embodiment drives only the disc D2 of a large diameter by means of the disc driving device B, and when the insertion of the disc D1 of a small diameter is detected, the disc D1 is ejected immediately. Base portions 21a, 21a of the detection pins 21, 21 are rotatably supported on shafts 22, 22 rotatably fixed to the bottom face of the casing 10. The detection pins 21, 21 are urged by springs 23, 23 in the direction in which the distance therebetween is shortened. With the detection pins 21, 21 abutted against stoppers 24, 24 provided on the bottom wall of the casing 10, the distance W between the detection pins 21, 21 is set so as to be a little wider than a diameter of the disc D1.

Figure 6:
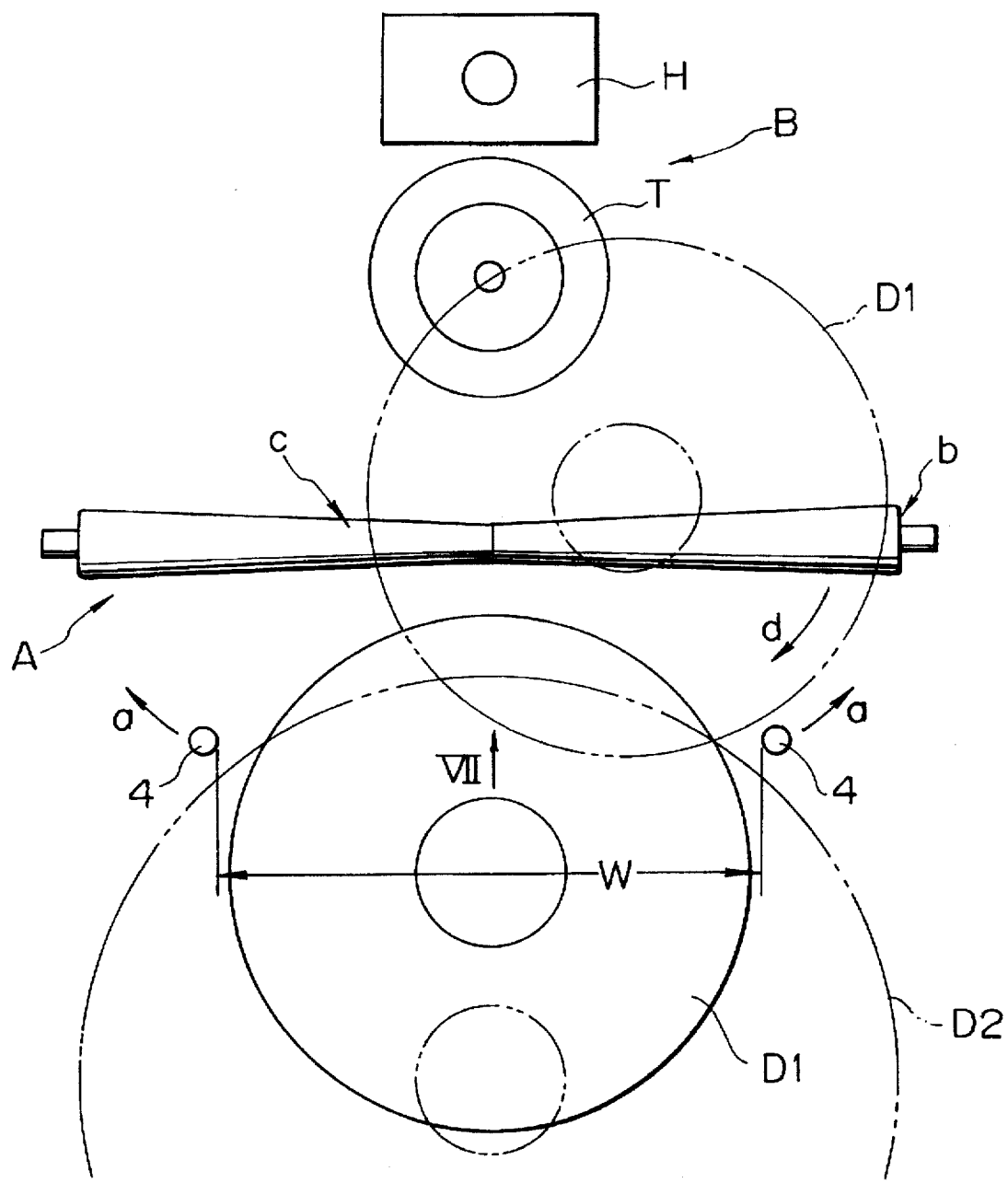
FIG. 6 is a plan view showing a simplified configuration of a conventional disc player.
Figure 7A:
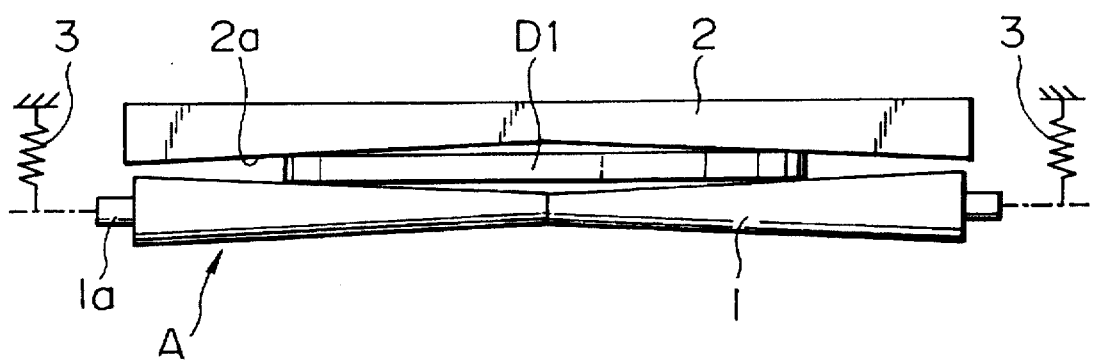
FIG. 7A is a front view of FIG. 6 showing a state where the disc of a small diameter is inserted in the central portion of the disc player.
Figure 7B:
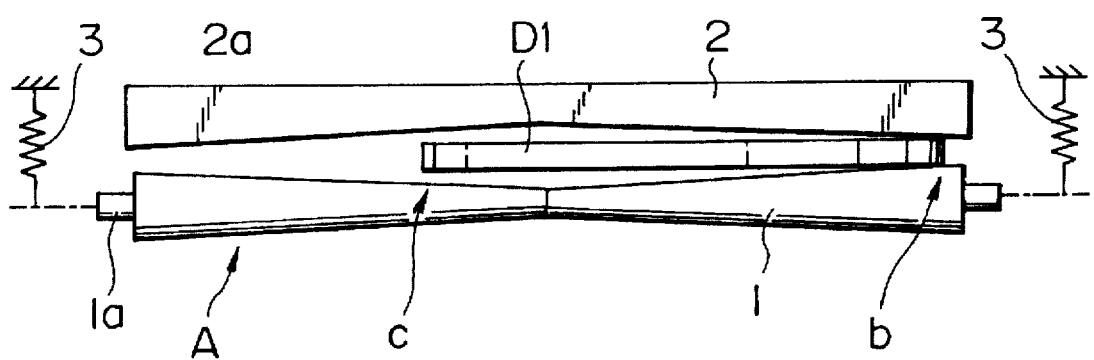
FIG. 7B is a front view of FIG. 6 showing a state where the disc of a small diameter is inserted in a deviated position.

The function of the detector pin 21, 21 is the same as that of the detection pins 4, 4 of the prior art disc player shown in FIG. 6. The detection pins 21, 21 are not simultaneously pushed outward (in the directions shown by the arrows a) when the disc D1 is inserted through the opening 11a, but are simultaneously pushed outward when the disc D2 is inserted. Whether or not the detection pins 21, 21 are simultaneously pushed aside is detected by a switch or the like, thereby discriminating whether a disc D1 or a disc D2 is being inserted into the CD player.

As shown in FIG. 3, the disc driving device B is provided behind the disc loading mechanism A. The disc driving device B includes a turntable T rotatably supported on a drive chassis 31, and a spindle motor for driving the turntable T which is fixed thereto. An optical head H is also attached to the drive chassis 31. A clamp chassis 32 is pivotally supported so as to be movable up and down relative to the drive chassis 31, and a clamper C, which opposes the turntable T, is rotatably supported by the clamp chassis 32.

Next, the disc loading operation of the vehicle-mounted CD player will be described.

When the disc is not loaded in the disc driving device B, the roller 14 is pressed to the guide top 13 by the urging force of the springs 18, 18, and positioned in the grooves 13k, 13k formed on the lower surface of the guide top 13, as shown in FIG. 4. At this time, at the opposing portion of the guide top 13 and the roller 14, the space E is formed which is widest at the axial central portion thereof and decreases gradually toward both axial end portions thereof from the axial central portion.

When insertion of the disc through the opening 11a is detected, a motor (not shown) is started, and the power thereof is transmitted to the gear 19 to rotate the roller 14. When the front end of the disc is pressed into the space E shown in FIG. 4, the disc is pulled between the guide top 13 and the roller 14 to be clamped thereby due to the rotating force of the roller 14, and then carried toward the disc driving device B due to the rotating force of the roller 14. As shown in FIG. 3, the disc is supported from the upper and lower sides by the roller 14 and the inclined surfaces 13i and 13j of the guide top 13 positioned at both sides of the roller 14. In this state, the rotating force of the roller 14 acts on the disc so that the disc slides on the inclined surfaces 13i and 13j to be moved into the disc player toward the disc driving device B.

When the disc D2 is inserted into the disc loading mechanism and carried by the rotating force of the roller 14, the central portion of the disc D2 is directed to the turntable T of the disc driving device B, the clamp chassis 32 descends and the central portion of the disc is clamped by the turntable T and the clamper C so that a sound reproduction of the disc is performed. At this time, the roller support member 16 descends and the roller 14 moves away from the disc D2 to the position shown by short dashed lines in FIG. 3. When the disc D2 is subsequently ejected, the roller 14 is moved upward toward the guide top 13 by means of the springs 18, 18, the disc is clamped by the guide top 13 and the roller 14 and ejected from the opening 11a due to the reverse rotating force of the roller 14.

According to the CD player of this embodiment, the guide top 13 is tilted pivoted to the directions shown by the arrows α and β in FIG. 1 about the central portion thereof by the support shafts 13a and 13b. Thus, when the disc D2 is clamped as shown in FIG. 5A, the guide top 13 always follows the position of the disc D2 so that both right and left edges of the disc D2 are always clamped by the roller 14 and the guide top 13 with a uniform pressure.

For example, even when the support member 12 is not exactly parallel to the roller 14 in an assembled state due to deformation of the guide top 13 such as twisting and warping caused at the time of manufacturing, or due to warping and bending of the roller support member 16, the guide top 13 can be tilted pivoted on the support shafts 13a and 13b so that both right and left edges of the disc D2 are clamped by the inclined surfaces 13i and 13j and the both right and left tapered portions of the roller 14 with a uniform pressure.

Figure 5A:
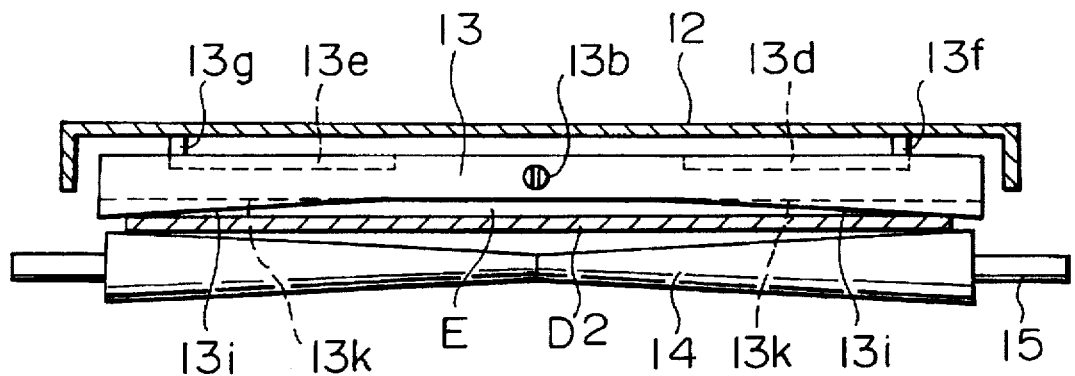
FIG. 5A is a sectional view taken substantially along the lines IV—IV of FIG. 1 showing a state where a disc of a large diameter is held by the disc loading/ejecting mechanism.

In addition, even when the disc D2 is inserted with the center thereof slightly deviated toward either of right and left directions of FIG. 5A with respect to the center of the roller 14, the guide top 13 tilts pivots in accordance with the position of the disc D2 so that both right and left edges of the disc D2 are clamped with a uniform pressure.

Accordingly, the disc D2 is smoothly carried by the disc loading mechanism A toward the disc driving device B in a linear path, thereby preventing either the right and left edges of the disc D2 from being damaged by abutting strongly against the guide portion or another mechanical part in the main body of the disc player. When the disc D2 is ejected after the disc reading operation is completed, the disc D2 is also smoothly ejected through the opening 11a due to a uniform carrying force which acts on both right and left edges of the disc D2.

The guide top 13 is provided with the elastic parts 13d and 13e, thereby keeping the guide top 13 parallel to the support member 12. Thus, when the disc is not clamped, as shown in FIG. 4, the guide top 13 is kept parallel to the roller 14 and the forward end of the disc D2 with respect to the direction of insertion is easily guided into the space E formed between the guide top 13 and the roller 14 so that the disc D2 is securely clamped by the guide top 13 and the roller 14 to be loaded into the player.

The elastic parts 13d and 13e need not be formed integrally with the guide top 13. Instead, plate springs may be provided between the guide top 13 and the support member 12 so that the guide top 13 is kept parallel to the support member 12 due to the elastic force of the plate springs.

Since the opening 11a for disc insertion has an open width capable of inserting therethrough the disc D2 of a large diameter, the disc D1 of a small diameter may also be inserted therethrough. In this embodiment, insertion of the disc D1 can be detected by the fact that the pair of detection pins 21, 21 are not simultaneously pushed outward (in the directions shown by the arrows a shown in FIG. 1). When insertion of the disc D1 is detected, the roller 14 rotates in the opposite direction to eject immediately the disc D1 through the opening 11a. Even when the disc D1 is inserted, a uniform ejection force is applied to the disc D1 by the tilting pivoting action of the guide top 13.

Figure 5B:
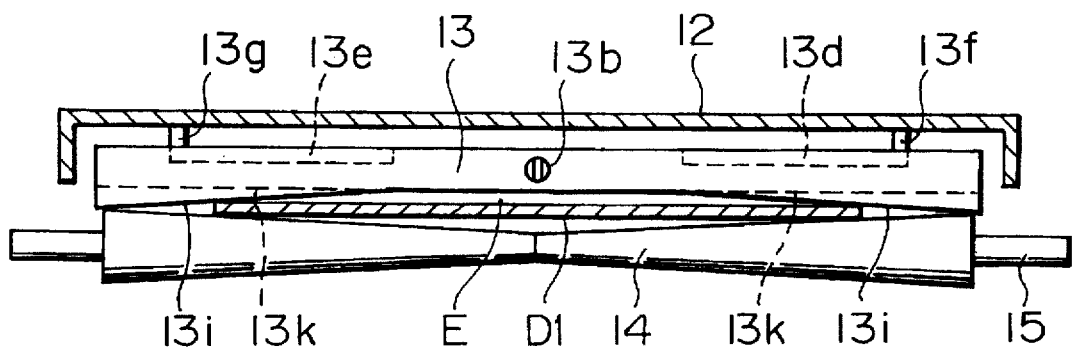
FIG. 5B is a sectional view taken substantially along the lines IV—IV showing a state where a disc of a small diameter inserted in the central portion of the disc loading/ ejecting mechanism is ejected out of the disc player.

FIG. 5B illustrates a state where the disc D1 is inserted in the space E at the axial center position of the roller 14. In this state, both edges of the disc D1 with respect to the width direction thereof are also clamped by the inclined surfaces 13i and 13j of the guide top 13 and the tapered portions of the roller 14.

Figure 5C:
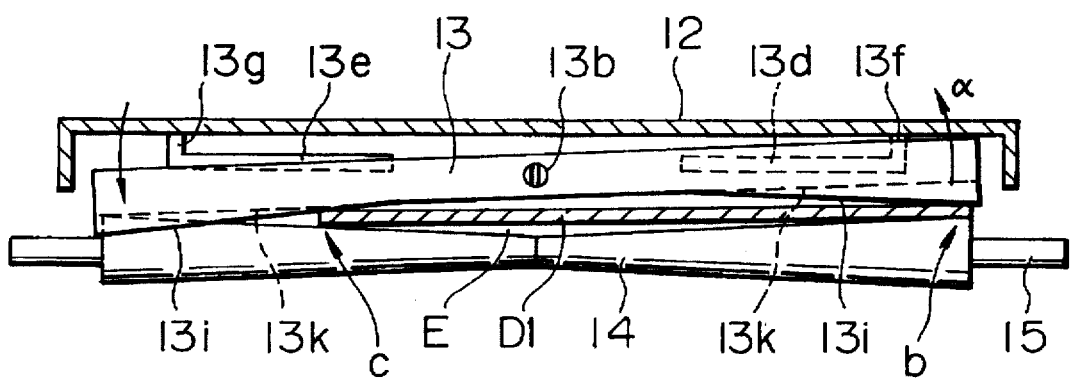
FIG. 5C is a sectional view taken substantially along the lines IV—IV showing a state where the disc of a small diameter is ejected out after it has been inserted at the deviated position in the disc loading/ejecting mechanism.

FIG. 5C illustrates a state where the disc D1 is inserted in the space E from the position deviated toward the axial right end side of the roller 14. When this occurs, the guide top 13 is tilted pivoted in the direction shown by the arrow α about the support shafts 13a and 13b, so that both end portions of the disc D1 are clamped uniformly by the inclined surfaces 13i and 13j of the guide top 13 and the tapered portions of the roller 14 at the portions b and c (FIG. 5C). Thus, at the positions b and c, a difference in ejecting force acting on the disc D1 from the roller 14 is minimized so that the disc D1 is ejected by uniform force. Therefore, when the disc D1 is inserted at the position deviated toward one end of the roller 14, as shown by the short dashed lines in FIG. 6, and ejected immediately, the detection pin 21 can be securely pressed aside in the direction shown by the arrow a even if the detection pin 21 blocks the direction of ejection, thereby preventing a situation in which the disc D1 is not ejected because it abuts against one of the detection pins 21.

In the embodiment as described above, the disc player is provided with the detection pins 21 for detecting insertion of the disc of a small diameter. However, such detection means may be omitted. For example, the disc player may detect and eject the disc of a small diameter by another means, or the disc player may be one which does not include the detection means of the disc of a small diameter.

In addition, in this embodiment, the disc loading device A carries in a disc inserted through the opening 11a. However, the disc player of this invention is not limited to this arrangement. The disc player may be one in which any one of the discs is selected from a disc mounting portion having a plurality of discs and the disc is carried toward the disc driving device B.

As described above, according to the present invention, it is possible to provide uniform carrying force to both end portions of the disc, and the disc is stably clamped by a guide member and a roller so as to be securely carried even if the guide member is deformed and deformation such as warping is caused in a roller support member.

Further, when elastic parts keeping the guide member parallel relative to a support member are formed integrally with the guide member, there is no need to provide spring members or the like separately which keeps the guide member parallel to a roller, so that the number of parts of the disc player can be reduced.

What is claimed is:

1. A disc loading/ejection mechanism for a disc player, the disc player including a casing, the disc loading/ejection mechanism comprising:
   an elongated guide member mounted on the casing, the guide member having a first central portion; and
   a roller having ends rotatably mounted on the casing, the roller being aligned in an axial direction and having a second central portion located opposite to the first central portion of the guide member;
   wherein a space is formed between the elongated guide member and the roller for receiving a disc, the space having a widest point between the first and second central portions, and gradually becomes narrower toward the ends of said roller, and
   wherein said guide member is pivotally connected to the casing such that the guide member is tiltable about an axis located at the first central portion, the axis being aligned perpendicular to the axial direction of the roller.

2. A disc loading/ejection mechanism according to claim 1, wherein said roller has a first diameter at the first and second ends, and a second diameter at the second central portion, the first diameter being larger than the second diameter, the roller tapering from the first and second ends to the second central portion.

3. A disc loading/ejection mechanism according to claim 1, wherein said guide member includes an inclined surface extending between the opposing ends, the inclined surface being spaced further from the roller at the first central portion than at the opposing ends.

4. A disc loading/ejection mechanism according to claim 3, wherein the guide member includes a groove extending between the opposing ends such that the inclined surface is divided into two parts, and said roller is disposed opposite said groove.

5. A disc loading/ejection mechanism according to claim 1, further comprising a support member fixedly mounted on the casing, the support member including recesses for pivotally receiving support shafts of the guide member, wherein said guide member includes elastic parts which press against the support member, and said guide member is urged by said elastic parts so that the position thereof is biased into a position approximately parallel to the support member.

6. A disc loading/ejection mechanism according to claim 5, wherein said guide member is formed of a synthetic resin material having a low friction coefficient, and said support member supporting said guide member is formed of a sheet metal material.

7. A disc player including a disc loading/ejection mechanism, the disc player including a casing and a nose portion having an opening for receiving a disc inserted in a disc insertion direction into the casing, the disc loading/ejection mechanism comprising:
   an elongated guide member mounted on the casing parallel to the opening, the guide member having a first central portion; and a roller having ends rotatably mounted on the casing, the roller having a second central portion located opposite to the first central portion of the guide member;
   wherein a space is formed between the guide member and the roller adjacent the opening for receiving a disc, the space having a widest point between the first and second central portions, and gradually becomes narrower toward the ends of said roller, and
   wherein said guide member is pivotally connected to the casing such that the guide member is tiltable about an axis located at the first central portion, the axis being aligned parallel to the insertion direction.

8. A disc loading/ejection mechanism according to claim 7, wherein said roller has a first diameter at the first and second ends, and a second diameter at the second central portion, the first diameter being larger than the second diameter, the roller tapering from the first and second ends to the second central portion.

9. A disc loading/ejection mechanism according to claim 7, wherein said guide member includes an inclined surface extending between the opposing ends, the inclined surface being spaced further from the roller at the first central portion than at the opposing ends.

10. A disc loading/ejection mechanism according to claim 9, wherein the guide member includes a groove extending between the opposing ends such that the inclined surface is divided into two parts, and said roller is disposed opposite said groove.

11. A disc loading/ejection mechanism according to claim 7, further comprising a support member fixedly mounted on the casing, the support member including recesses for pivotally receiving support shafts of the guide member, wherein said guide member includes elastic parts which press against the support member, and said guide member is urged by said elastic parts so that the position thereof is biased into a position approximately parallel to the support member.

12. A disc loading/ejection mechanism according to claim 11, wherein said guide member is formed of a synthetic resin material having a low friction coefficient, and said support member supporting said guide member is formed of a sheet metal material.

* * * * *